(12) United States Patent
Sutasirisap et al.

(10) Patent No.: US 11,272,140 B2
(45) Date of Patent: Mar. 8, 2022

(54) DYNAMIC SHARED EXPERIENCE RECOMMENDATIONS

(71) Applicant: Meta Platforms, Inc., Menlo Park, CA (US)

(72) Inventors: Suchada Sutasirisap, Redwood City, CA (US); John Kilcline, Palo Alto, CA (US); Tomas Brennessl, San Francisco, CA (US); Tianyu Li, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/784,105

(22) Filed: Feb. 6, 2020

(65) Prior Publication Data
US 2021/0176427 A1 Jun. 10, 2021

Related U.S. Application Data

(60) Provisional application No. 62/943,626, filed on Dec. 4, 2019.

(51) Int. Cl.
*H04N 7/15* (2006.01)
*H04L 29/06* (2006.01)
(Continued)

(52) U.S. Cl.
CPC ........... *H04N 7/152* (2013.01); *G06F 3/0482* (2013.01); *G06F 3/0484* (2013.01); *G06F 9/451* (2018.02);
(Continued)

(58) Field of Classification Search
CPC ........ H04N 7/152; H04N 7/15; G06F 3/0482; G06F 3/0484; G06F 9/451;
(Continued)

(56) References Cited

U.S. PATENT DOCUMENTS

| 10,078,909 B1* | 9/2018 | Chen ...................... G06N 20/00 |
| 2013/0147905 A1* | 6/2013 | Vivekanandan ....... H04N 7/157 348/14.08 |

(Continued)

OTHER PUBLICATIONS

PCT International Search Report and Written Opinion, PCT Application No. PCT/US2020/060437, dated Feb. 12, 2021, 10 pages.

*Primary Examiner* — Stella L. Woo
(74) *Attorney, Agent, or Firm* — Fenwick & West LLP (57) ABSTRACT

A communication server facilitates a video call between client devices of a plurality of participants. During the video call, the communication server identifies an in-call activity to recommend to the plurality of participants in the video call based on user information. The in-call activity is selected to be relevant to each of the plurality of participants and jointly recommended to the plurality of participants of the video call. To identify the recommended in-call activity, the communication server may determine common interests among the plurality of participants and select an in-call activity that is associated with the common interests. After the recommended in-call activity is selected, an indication of the recommended in-call activity is provided to the client devices to enable the client devices to display a user interface including the in-call activity to the participants during the video call.

20 Claims, 5 Drawing Sheets

(51) Int. Cl.
    *G10L 15/22*     (2006.01)
    *G06F 9/451*     (2018.01)
    *G06F 3/0482*     (2013.01)
    *G06F 16/2457*     (2019.01)
    *G06F 3/0484*     (2013.01)
    *H04L 65/1096*     (2022.01)

(52) U.S. Cl.
    CPC ........ *G06F 16/24578* (2019.01); *G10L 15/22* (2013.01); *H04L 65/1096* (2013.01)

(58) Field of Classification Search
    CPC ............... G06F 16/24578; G10L 15/22; H04L 65/1096; H04L 65/1083
    See application file for complete search history.

(56) References Cited

U.S. PATENT DOCUMENTS

| | | | |
|---|---|---|---|
| 2013/0307920 A1* | 11/2013 | Cahill | .................... H04N 5/265 |
| | | | 348/14.03 |
| 2016/0234152 A1* | 8/2016 | Allen | .................... G06F 16/951 |
| 2016/0239547 A1 | 8/2016 | Lim et al. | |
| 2016/0255170 A1 | 9/2016 | Gargi et al. | |
| 2018/0098030 A1 | 4/2018 | Morabia et al. | |
| 2019/0297301 A1* | 9/2019 | Ahn | .................... G06K 9/00355 |
| 2019/0342507 A1* | 11/2019 | Dye | ........................ H04N 7/141 |
| 2020/0057804 A1* | 2/2020 | Apanovych | ............. G06F 16/34 |

\* cited by examiner

DYNAMIC SHARED EXPERIENCE RECOMMENDATIONS

CROSS REFERENCE TO RELATED APPLICATIONS

This application claims the benefit of U.S. Provisional Application No. 62/943,626 filed Dec. 4, 2019, which is incorporated by reference in its entirety.

BACKGROUND

Network-based video calling is becoming a common way of communicating. Network-based video calling may be provided through social networking systems that allow users in the social networking systems to communicate and stay connected through different means such as messaging, posting content, and calling.

SUMMARY

This disclosure relates generally to making activity recommendations during a video call, and more specifically to making a joint recommendation to a plurality of participants of the video call.

Video call platforms may provide in-call features to video calls that enhance audio and visual experiences by allowing users to participate in activities together despite not being in a same location. In-call activities can improve user experiences by helping the users feel more connected by allowing them to share an experience while on a video call as if they were in the same room sharing the experience. However, with a large selection of possible in-call features, it can be difficult for users to select one in-call activity that is relevant to all of the participants on the video call.

Embodiments relate to making a joint recommendation for one or more in-call activities to a plurality of participants of a video call. A communication server facilitates a video call between client devices of the plurality of participants over a network. For each participant associated with a client device in the video call, the communication server retrieves user information. Based on the user information of the participants, the communication server determines common interests among the participants. The communication server identifies one or more in-call activities associated with the common interests and selects a recommended in-call activity from the identified one or more in-call activities for the plurality of participants. After selecting the recommended in-call activity, the communication server transmits an indication of the recommended in-call activity to a client device in the video call to enable the client device to display a user interface control for initiating the recommended in-call activity. When the communication server receives a selection from the client device to initiate the recommended in-call activity, the communication server initiates the recommended in-call activity on each of the plurality of client devices in the video call.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
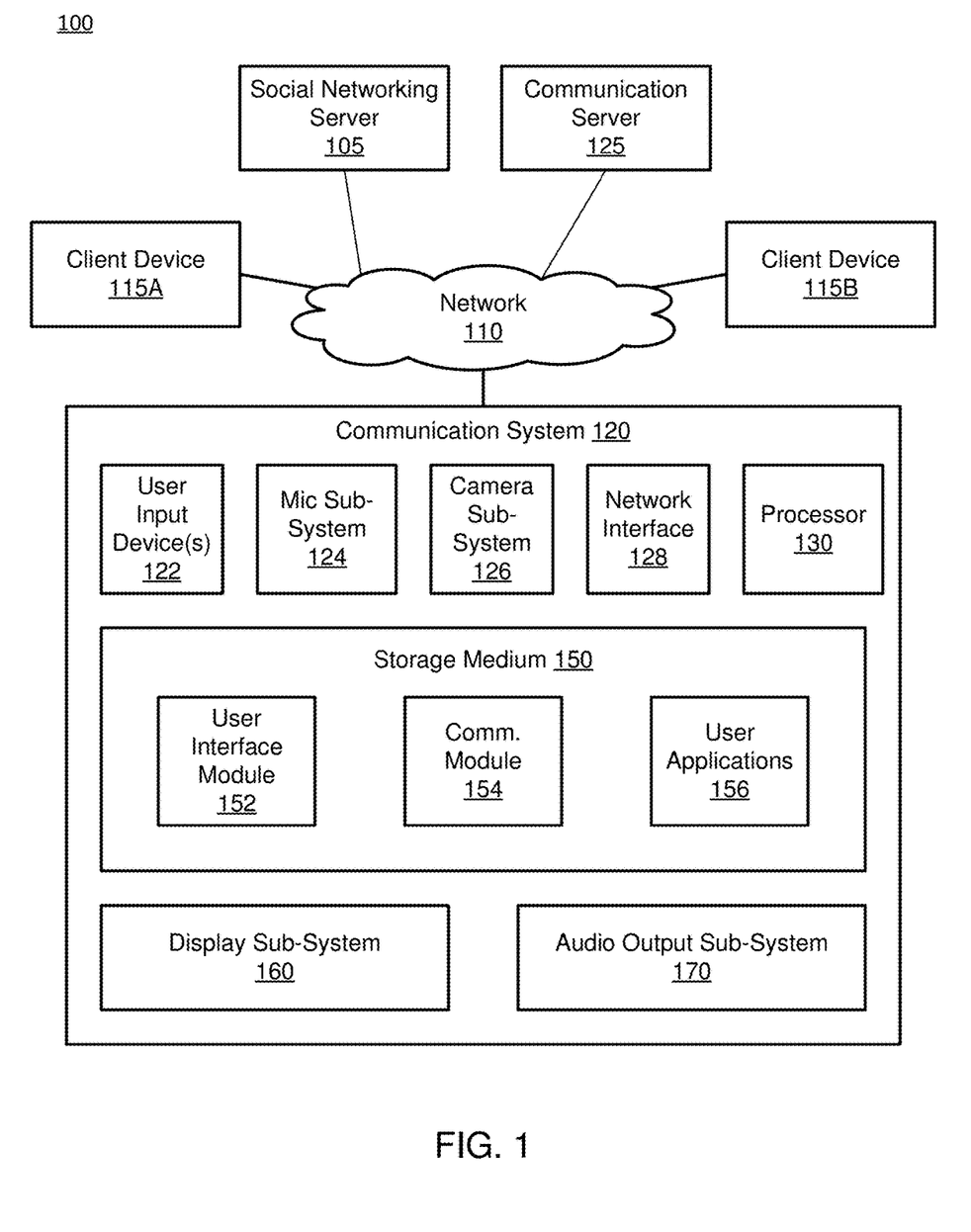
FIG. 1 is a block diagram of a system environment for a communication system, in accordance with an embodiment.

FIG. 1 is a block diagram of a system environment 100 for a communication system 120. The system environment 100 includes a social networking server 105, one or more client devices 115 (e.g., client devices 115A, 115B), a network 110, a communication system 120, and a communication server 125. In alternative configurations, different and/or additional components may be included in the system environment 100. For example, the system environment 100 may include additional client devices 115 or additional communication systems 120.

The social networking server 105 manages information about users of a social network and activities performed by the users on the social network. The social networking server 105 allows users of the social network to connect with others over the network 110 by sharing content with other users of the social network and viewing content shared by other users and entities such as businesses or organizations. Users may access the social networking server 105 via client devices 115 or communication system 120. Details on the social networking server 105 is described with respect to FIG. 2A.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 125 facilitates communications of the client devices 115 and the communication system 120 over the network 110. For example, the communication server 125 may facilitate connections between the communication system 120 and a client device 115 when a voice or video call is requested. Additionally, the communication server 125 may control access of the communication system 120 to various external applications or services available over the network 110. In an embodiment, the communication server 125 may provide updates to the communication system 120 when new versions of software or firmware become available. In other embodiments, various functions described below as being attributed to the communication system 120 can instead be performed entirely or in part on the social networking server 105 and/or communication server 125. For example, in some embodiments, various processing or storage tasks may be offloaded from the communication system 120 and instead performed on the social networking server 105 and/or communication server 125.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, and user applications 156. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

Figure 2A:
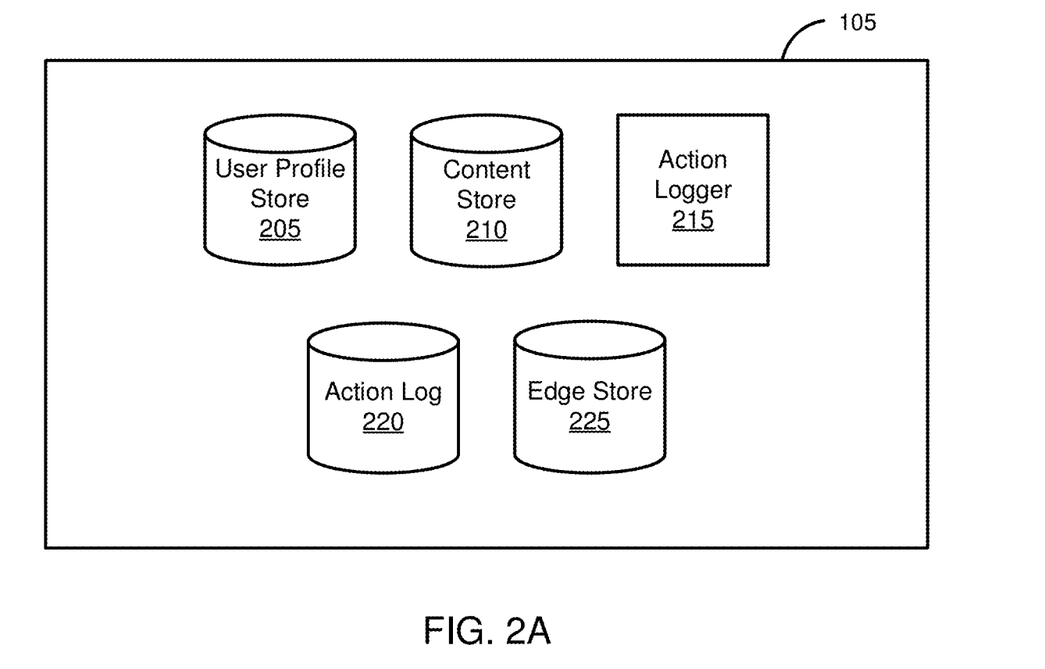
FIG. 2A is a block diagram of an architecture of a social networking server, in accordance with an embodiment.

FIG. 2A is a block diagram of an architecture of the social networking server 105. The social networking server 105 shown in FIG. 2A includes a user profile store 205, a content store 210, an action logger 215, an action log 220, and an edge store 225. In other embodiments, the social networking server 105 may include additional, fewer, or different components for various applications. Conventional components such as network interfaces, security functions, load balancers, failover servers, management and network operations consoles, and the like are not shown so as to not obscure the details of the system architecture. The social networking server 105 may use a single processor or a multi-processor system in conjunction with a storage medium such as a non-transitory computer-readable storage medium that stores instructions executable by the processor(s) to carry out various functions described herein.

The social networking server 105 links an online system (e.g., social networking system) via the network 110 to the one or more client devices 115, as well as to the one or more communication systems 120. The social networking server 105 serves web pages, as well as other content, such as JAVA®, FLASH®, XML and so forth. The social networking server 105 may receive and route messages between the online system and the client devices 115 and the communication system, for example, instant messages, queued messages (e.g., email), text messages, short message service (SMS) messages, or messages sent using any other suitable messaging technique. A user may send a request to the social networking server 105 to upload information (e.g., images or videos) that are stored in the content store 210. Additionally, the social networking server 105 may provide application programming interface (API) functionality to send data directly to native client device operating systems, such as IOS®, ANDROID™, or BlackberryOS.

Each user of the social networking system supported by the social networking server 105 is associated with a user profile, which may be stored in the user profile store 205. A user profile includes declarative information about the user that was explicitly shared by the user and may also include profile information inferred by the social networking server 105. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In one embodiment, a user profile includes explicit insights and implicit insights about a user determined by the social networking server 105. The social networking server 105 may determine explicit insights about a user based on the user's activity on a social network. When a user likes, shares, follows, saves, or comments on a content item, the social networking server 105 gathers explicit insights about the user's interests based on actions that were explicitly performed by the user. The explicit insight represents a user's expressed interest or dislikes towards topics, objects on the social network, other users, events, applications, pages, activities, and the like. The social networking server 105 may also determine implicit insights about a user based on content read or watched by the user, demographic information, user behavior, time of day, geography, activity of the user's friends. Although not based on information directly shared by the user, implicit insights can be inferred about the user and stored in the user profile to provide additional information about the user.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the social networking server 105, events, groups or applications. In some embodiments, objects are received from third-party applications or third-party applications separate from the social networking server 105. In one embodiment, objects in the content store 210 represent single pieces of content, or content "items." Hence, online system users are encouraged to communicate with each other by posting text and content items of various types of media to the social networking server 105 through various communication channels. This increases the amount of interaction of users with each other and increases the frequency with which users interact within the social networking server 105.

In various embodiments, a content item includes various components capable of being identified and retrieved by the social networking server 105. Example components of a content item include: a title, text data, image data, audio data, video data, a landing page, a user associated with the content item, or any other suitable information. The social networking server 105 may retrieve one or more specific components of a content item for presentation in some embodiments. For example, the social networking server 105 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the social networking server 105 logs interactions between users presented with the content item or with objects associated with the content item. Additionally, the social networking server 105 receives compensation from a user associated with content item as online system users perform interactions with a content item that satisfy the objective included in the content item.

Additionally, a content item may include one or more targeting criteria specified by the user who provided the content item to the social networking server 105. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the social networking server 105. Targeting criteria may also specify interactions between a user and objects performed external to the social networking server 105, such as on a third party system (not shown). For example, targeting criteria identifies users that have taken a particular action, such as sent a message to another user, used an application, joined a group, left a group, joined an event, generated an event description, purchased or reviewed a product or service using an online marketplace, requested information from a third party system, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the social networking server 105, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking server 105 to track user actions on the social networking server 105, as well as actions on third party systems that communicate information to the social networking server 105. Users may interact with various objects on the social networking server 105, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking server 105 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking server 105 as well as with other applications operating on the social networking server 105. In some embodiments, data from the action log 220 is used to infer interests or preferences of a user, augmenting the interests included in the user's user profile and allowing a more complete understanding of user preferences.

The action log 220 may also store user actions taken on a third party system, such as an external website, and communicated to the social networking server 105. For example, an e-commerce website may recognize a user of an social networking server 105 through a social plug-in enabling the e-commerce website to identify the user of the social networking server 105. Because users of the social networking server 105 are uniquely identifiable, e-commerce websites, such as in the preceding example, may communicate information about a user's actions outside of the social networking server 105 to the social networking server 105 for association with the user. Hence, the action log 220 may record information about actions users perform on a third party system, including webpage viewing histories, advertisements that were engaged, purchases made, and other patterns from shopping and buying. Additionally, actions a user performs via an application associated with a third party system and executing on a client device 110 may be communicated to the action logger 215 by the application for recordation and association with the user in the action log 220.

In one embodiment, the edge store 225 stores information describing connections between users and other objects on the social networking server 105 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking server 105, such as expressing interest in a page on the social networking server 105, sharing a link with other users of the social networking server 105, and commenting on posts made by other users of the social networking server 105. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking server 105, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking server 105 over time to approximate a user's interest in an object or in another user in the social networking server 105 based on the actions performed by the user. A user's affinity may be computed by the social networking server 105 over time to approximate the user's interest in an object, in a topic, or in another user in the social networking server 105 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Figure 2B:
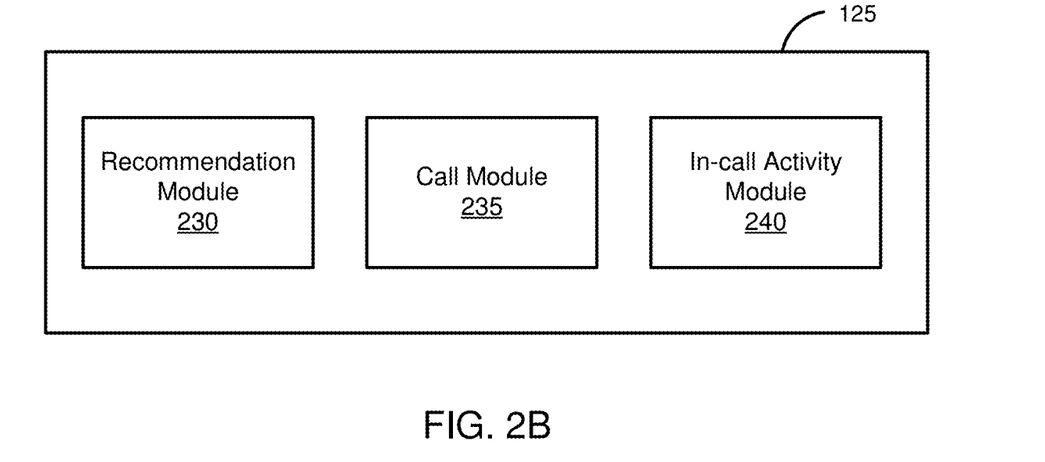
FIG. 2B is a block diagram of an architecture of a communication server, in accordance with an embodiment.

FIG. 2B is a block diagram of an architecture of a communication server, in accordance with an embodiment. The communication server 125 facilitates video calls among a plurality of participants associated with a plurality of client devices 115 over the network 110. Video calls may also be made using a communication system 120. Responsive to a video call request from a caller client device 115, the communication server 125 initiates a video call between the caller client device 115 and one or more receiver client device 115 specified by the caller client device 115 in the video call request.

The communication server 125 includes a recommendation module 230, a call module 235, and an in-call activity module 240. In other embodiments, the communication server 125 may include fewer, or different components for various applications. Conventional components such as network interfaces, security functions, load balancers, failover servers, management and network operations consoles, and the like are not shown so as to not obscure the details of the system architecture. The communication server 125 may use a single processor or a multi-processor system in conjunction with a storage medium such as a non-transitory computer-readable storage medium that stores instructions executable by the processor(s) to carry out various functions described herein.

The recommendation module 230 selects one or more in-call activities to include in a joint recommendation for a group of participants of a video call that are relevant to each of the participants. To encourage users to engage in in-call activities during a video call, the recommendation module 230 may select recommended in-call activities that are personalized for the group of participants in the call. After selecting the recommended in-call activities for the group of participants, the communication server 125 provides the recommendations to each of the client devices 115 participating in the video call. The communication server 125 transmits an indication representing the recommendations via the network 110 to the client devices 115. Responsive to receiving the recommendations, the client devices 115 generate a user interface to display graphical elements representative of the recommendations that enables initiation of the recommended in-call activity when selected during the video call.

In-call activities available on the video call may include one or more of the following: watching a video, listening to music, interactive book reading, visual effects, games, classes (e.g., educational, cooking, exercise), reading news articles, collaborative document editing, and karaoke. Each of the different in-call activities may be performed using an individual application that can be executed during the video call. The in-call activities provide interactive elements to all participants of a video call on their respective client devices 115 with facilitation from the communication server 125. For example, when activities involving media such as "watching a video" or "listening to music" is selected, the media associated with the activity is presented to all of the call participants within the video call, allowing the participants to communicate and participate in a same activity as if they were in the same room. When "interactive book reading" is selected, a digital book may be presented to each of the participants, allowing the call participants to read together. A participant that is reading the book may interact with the digital book (e.g., flip the page) and the interaction may be carried out for all of the participants in the call as if they are all reading out of one physical book together. The book may be displayed in a way that allows the participants to see other callers in one window of the video call and the book in another window of the video call. When "visual effects" is selected, the video of the participants may be overlaid with a visual effect such as a filter. The client devices 115 may communicate with the application hosting the selected in-call activity via the communication server 125 and receive the media through the network 110.

In one embodiment, the recommendation module 230 may select a recommended in-call activity based on information from the social networking server 105 including explicit insights and implicit insights about participants in the video call retrieved from the user profile store, actions performed by the participants within the social network stored by the action log, affinity of the participants towards objects in the social network stored by the edge store 225, as well as external factors such as the time of day, time of year, upcoming holidays, upcoming events, significant dates (e.g., birthday, anniversary), and weather. The user information may also include past use history of in-call activities that shows previously selected in-call activities of the participants.

In an embodiment, if a user chooses to opt in to the feature, the recommendation module 230 may analyze audio signals and video signals captured by client devices 115 to identify additional features about the user and the user's environment using content recognition. During a video call, the communication server 125 may identify details about the environment surrounding the participants (e.g., in a kitchen, in a living room), user characteristics, and user mood using sound recognition or image recognition algorithms. The recommendation module 230 may request permission from a participant prior to using content recognition and enable the user to opt out of these factors being used to generate recommendations.

Because the recommended in-call activities for a video call depends on the participants in the call, the recommended in-call activities may be dynamically updated as new participants are added to the call. For example, during a first session of a video call, the recommendation module 230 may select a first set of recommended in-call activities for a first participant and a second participant based on its relevancy to the two participants. During a second session of the video call, a third participant may be added to the video call, which causes the recommendation module 230 to select a second set of recommended in-call activities for the second session to be relevant to all three participants. Similarly, the recommended in-call activities may be updated when a participant leaves the video call.

The recommended in-call activities may be dynamically updated over time. In an embodiment, the recommendation module 230 may periodically update the recommendation (e.g., every 10 minutes) during a video call. If at least one recommended in-call activity is not selected by the participants during a threshold time period, the recommendation module 230 may update the recommendation to include a different set of in-call activities. In one embodiment, the recommendation module 230 may receive a request from one or more client devices 115A to update the recommendation.

In one embodiment, the recommendation module 230 may analyze the explicit insights and implicit insights of the participants in the video call and identify overlapping interests among the participants. The recommendation module 230 may then identify in-call activities that correspond to the identified overlapping interests. In another embodiment, the recommendation module 230 may first identify recommended in-call activities for each of the participants in the video call individually. Once the recommended in-call activities for the participants are determined, the recommendation module 230 identifies in-call activities that are common across the plurality of participants. To determine the recommendation for the individual participants, the recommendation module 230 may use implicit insights and explicit insights associated with the user and identify a plurality of in-call activities that correspond to the insights.

To determine which in-call activities to recommend, the recommendation module 230 may generate a score for each of the in-call activities corresponding to common interests of the participants. For each in-call activity that corresponds to the common interests, the recommendation module 230 may generate a score for each participant. The score may represent a likelihood of the participant selecting the particular in-call activity responsive to being recommended the in-call activity. The recommendation module 230 may determine an aggregate score for each in-call activity based on the individual scores of the participants. The recommendation module 230 may rank the in-call activities based on the aggregate scores and select one or more recommended in-call activities based on the ranking.

In one embodiment, the recommendation module 230 may use a machine learning model to select in-call activities to recommend. The recommendation module 230 may receive input data associated with a group of participants in a video call. The input data may include explicit insights, implicit insights, external factors (e.g., location, time of day), and information from content recognition. The recommendation module 230 applies the machine learning model that identifies one or more recommendations of in-call activities for the group of participants.

In an example of a recommendation generated using various contextual information, a grandparent on a first client device may be on a video call with a grandchild on a second client device, where the second client device is associated with a parent of the grandchild. The communication server 125 may use an age recognition algorithm and other content recognition algorithms to dynamically determine characteristics of participants and identify that a child is on the call.

Continuing with the example above, the recommendation module 230 may use content recognition to identify features to predict relevant in-call activities. The grandchild on the video call may be wearing pajamas and may be in a bedroom including children's toys and information may be gathered by applying content recognition algorithms to the background of the environment. In addition, it may be night time in the time zone where the client device 115 that the grandchild is calling from is located. Given factors such as relationship between the participants (e.g., grandparents and grandchild), outfit suggesting that the child is preparing for bed, and that it is night time where the grandchild is located, the recommendation module 230 may recommend a story time app to allow the participants to read a bed time story together. If the time zone suggests that it is in the morning instead, the recommendation module 230 may recommend watching a cartoon together instead of the story time app.

In one example, a long-distance couple may be participating in a video call in the evening of their anniversary. Given the relationship between the users and the significant date, the recommendation module 230 may recommend watching their wedding video together. The recommendation module 230 may receive information about the relationship between the users from the social networking server 105. For example, the social network profiles of the users may include relationship status and the anniversary date of the users. The couple may also post on the social network including words such as "Happy Anniversary" and tag each other, which can indicate that they are celebrating their anniversary.

In one example, each of the participants in a video call may be getting ready for a party. The recommendation module 230 may receive calendar information from the social networking server 105 indicating that all the participants have accepted an invite to a party that begins within the next two hours. Based on the information, the recommendation module 230 may recommend an app for listening to music and suggest a playlist that includes artists that the participants like in common.

In an embodiment, the recommendation module 230 may select an in-call activity for video call, and after selecting the in-call activity, personalize it to the group of participants in the video call. For example, the recommendation module 230 may first determine that the in-call activities of "reading" or "listening to music" may be relevant for the participants. The recommendation module 230 may then customize the activity by selecting a particular book to recommend for the "reading" recommendation or selecting a particular album for the "listening to music" recommendations. For example, if the participants recently checked into a concert together, the recommendation module 230 may suggest listening to new album from the artist that performed at the concert.

The recommendation module 230 may recommend in-call activities that are in different categories to give a variety of options to the users. The recommendation module 230 may group candidate in-call activities into categories (e.g., music-related, news-related, video-related) and select a highest ranked activity within each of the categories for recommending.

The call module 235 facilitates audio and video calls between a plurality of client devices 115. The call module 235 may receive a request from a client device 115 of a caller to be connected to one or more client devices 115 of one or more call receivers. The call module 235 allows client devices 115 in the video call to communicate by facilitating exchange of audio signals and video signals between the client devices 115.

The in-call activity module 240 facilitates providing an in-call activity to each of the participants of a video call. When an in-call activity is selected during a video call, the in-call activity module 250 may facilitate a connection between each of the client devices 115 and an application associated with the in-call activity that is managed outside of the social network. The in-call activity module 240 may receive a request from one or more client devices 115 to initiate the selected in-call activity. Responsive to receiving the request, the in-call activity module 240 communicates with the application associated with the selected in-call activity to provide the in-call activity to each of the client devices 115.

Figure 3A:
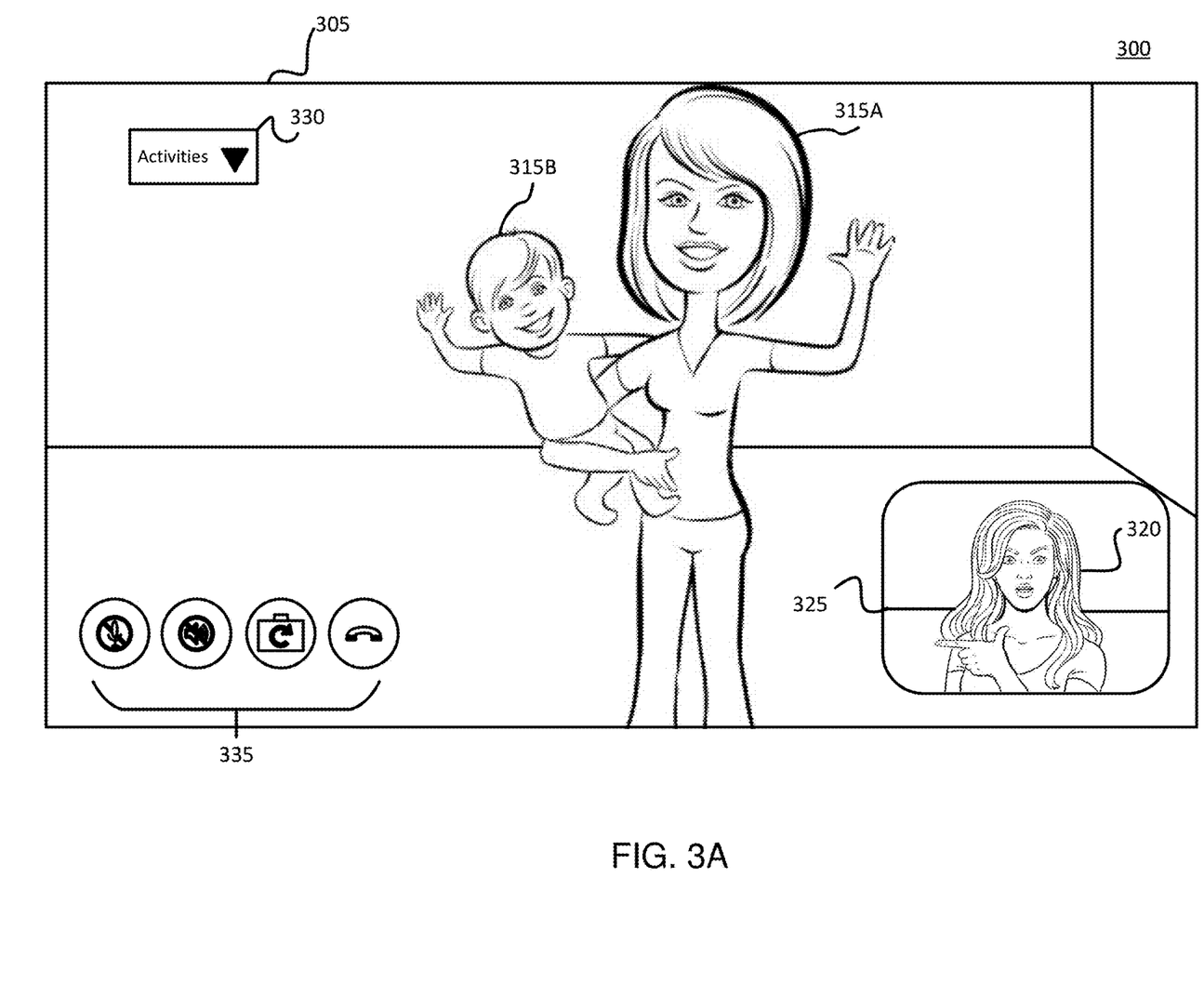
FIG. 3A is an example user interface of a video call, in accordance with an embodiment.

FIG. 3A is an example user interface 300 of a video call, in accordance with an embodiment. The user interface 300 includes a first window 305 that displays video from a first client device associated with remote users 315A and 315B and a second window 325 that displays video from a second client device associated with a local user 320. The first window 305 may be larger in size than the second window 325 because the first window 305 displays incoming video signals from the remote users 315A and 315B to the local user 320. The user interface 300 may include an activity control 330 that can expand and collapse based on user interaction. When the activity control 330 is expanded, the activity control 330 displays a control for each of the available in-call activities that may be selected by users for initiating an in-call activity for co-experiencing with other participants in the video call.

Figure 3B:
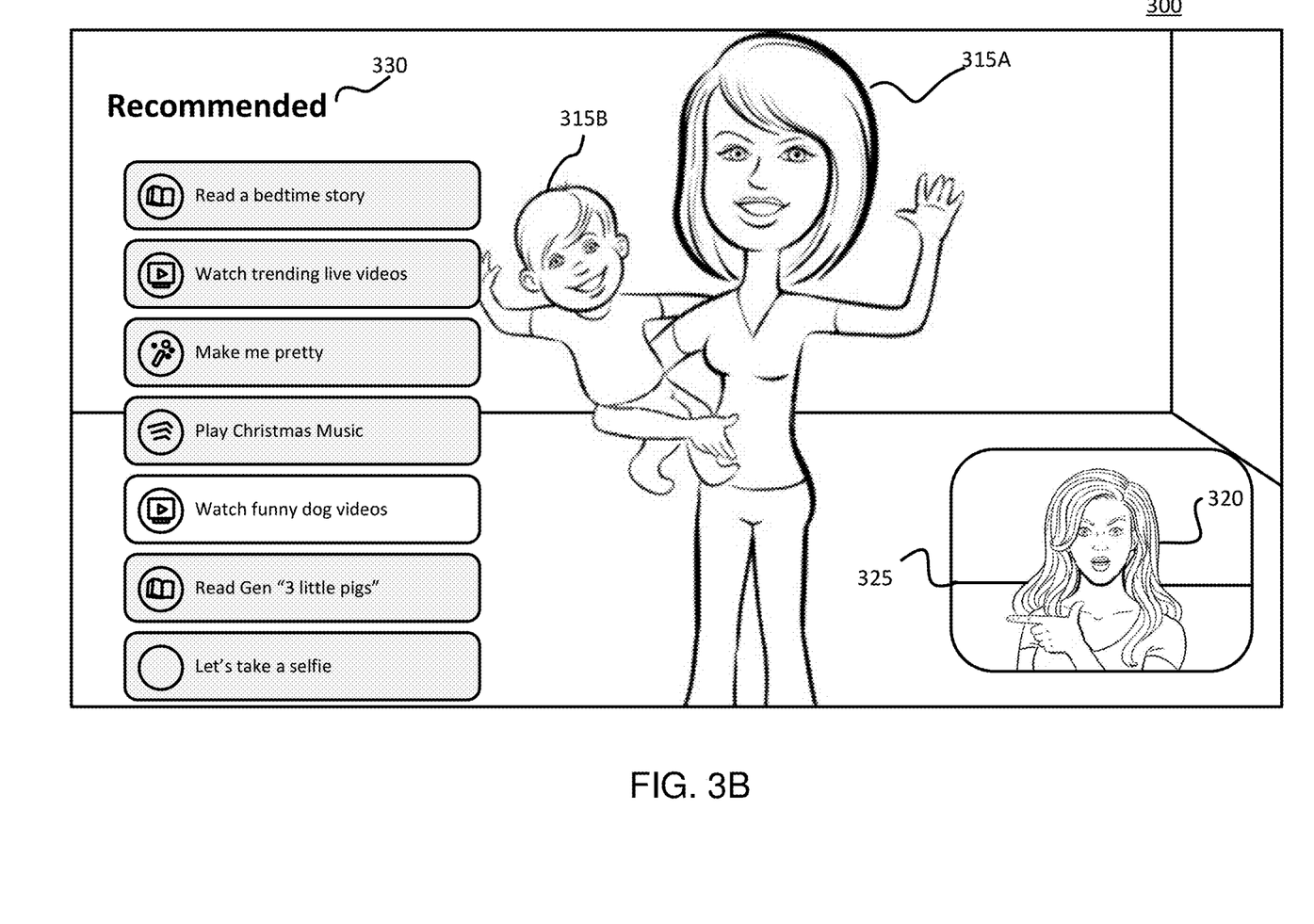
FIG. 3B is an example user interface of the video call including in-call activity recommendations, in accordance with an embodiment.

FIG. 3B is an example user interface of the video call including in-call activity recommendations, in accordance with an embodiment. When a user interacts with a graphical element associated with the activity control 330 (e.g. by clicking, providing touch input), the activity control 330 may expand and display a list of available in-call activities. In an embodiment, the activity control 330 may automatically display the list of in-call activities without requiring user interaction with the activity control 330. The user interface 300 may include video call controls 335 including a mic button, a mute button, a camera orientation button, and an end call button. The video call controls 335 may include additional or different controls than what is shown in FIG. 3A.

When the recommendation module 230 of the communication server 125 generates an updated recommendation, it transmits an indication of the recommended in-call activity to update the activity control 330 that displays the recommended in-call activity to include the associated in-call activity. The activity control 330 may overlap a portion of the first window 305 that displays video signal collected by a client device. The activity control 330 may be displayed as a transparent image such that the portion of the first window 305 that is overlaid with the activity control 330 may be visible behind the activity control 330.

The activity control 330 may include one or more recommended in-call activities as well as default activities that are always presented to a user in the activity control 330. The default activities may include activities that are presented to all users by default because it is popular across users of the social network and activities that are frequently accessed by a particular user. When the activity control 330 is displayed to the different participants in the video call, positions of the recommended in-call activities may be same for each of the participants or different for the participants. A particular in-call activity may be displayed at the top for the remote users 315 but displayed at the bottom for the local user 320.

In one embodiment, the activity control 330 may include a graphical element for searching through available in-call activities. Although not shown in FIG. 3B, the graphical element may be a set of arrows or a scroll bar. When the client device receives an input from a user via the graphical element such as a scrolling command to display a different set of in-call activities, the client device updates the user interface to remove an existing in-call activity from display and adds a new in-call activity.

In one embodiment, the client device may receive a request for a preview of an in-call activity. For example, a cursor may indicate a position of a user's movement within the activity control 330. As a user browses through the activity control 330, the client device may visually distinguish an in-call activity that the cursor is pointing to (e.g., change font, highlight). When the cursor lies over a particular in-call activity for more than a threshold duration, the client device may automatically display a preview of the in-call activity. For example, if the cursor lies over the in-call activity of "watch funny dog videos," a thumbnail view of a dog video may appear in a new window within the user interface 300.

In one embodiment, after a participant selects an activity, the activity may automatically be initiated on each of the devices on the call. In another embodiment, if the remote users 315 select an in-activity, the user interface 300 may display a message to a local user indicating that the remote user has selected the in-call activity and invite the local user to join.

Figure 4:
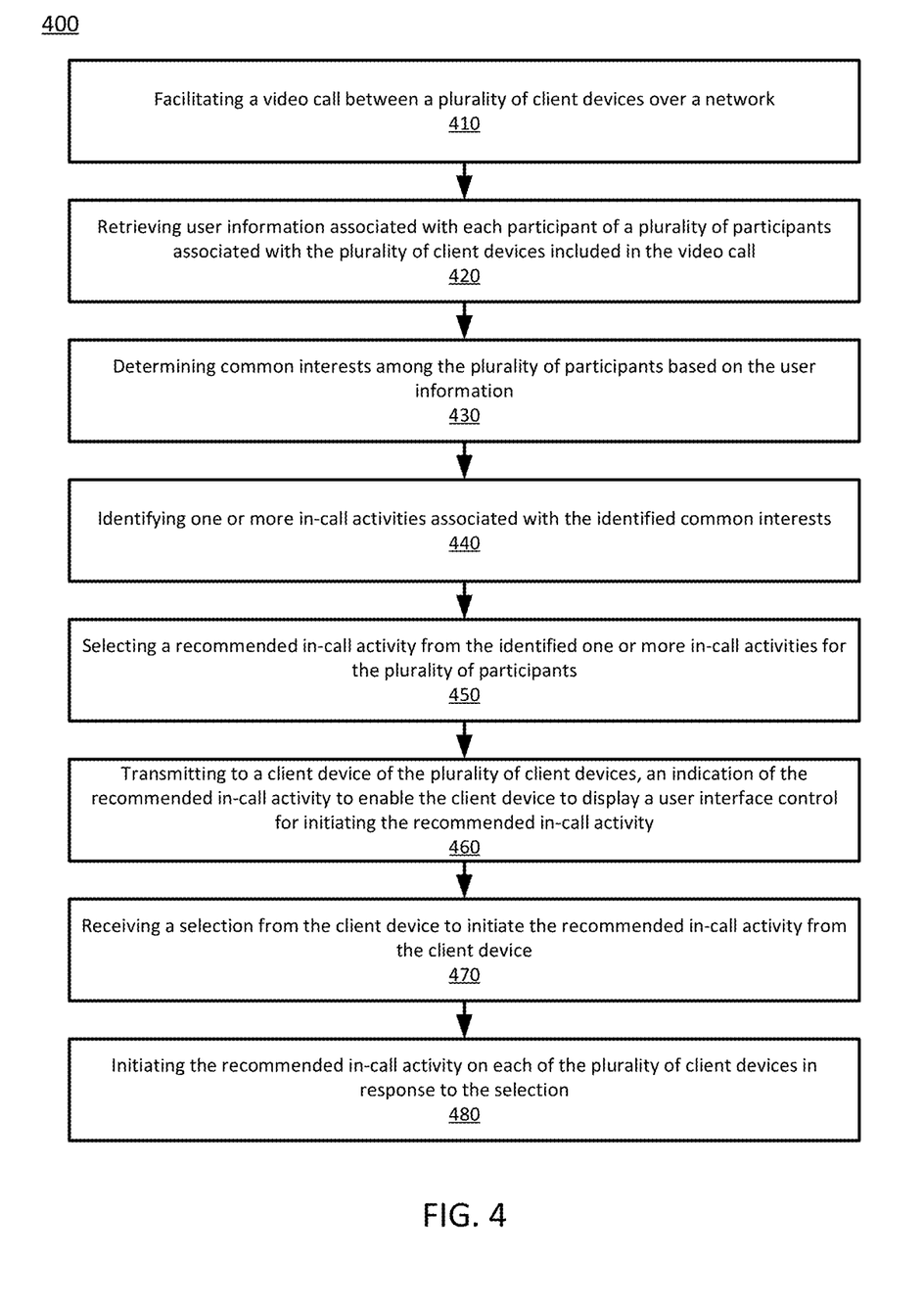
FIG. 4 is a flowchart illustrating a process for selecting an in-call activity for participants of a video call, in accordance with an embodiment.

FIG. 4 is a flowchart illustrating a process for selecting an in-call activity for participants of a video call, in accordance with an embodiment. In a process 400 for making a recommendation for in-call activity to a plurality of participants of a video call, a communication server facilitates 410 a video call between a plurality of client devices over a network. The communication server may be associated with a social network that maintains user profiles including user information of participants associated with the plurality of client devices. The communication server retrieves 420 user information associated with each participant of the plurality of participants associated with the plurality of client devices included in the video call. Based on the retrieved user information, the communication server determines 430 common interests among the plurality of participants. The common interests may be determined based on explicit insights and/or implicit insights about the plurality of participants. The explicit insights and the implicit insights may be determined based on user activities on the social network, external factors such as date, time of day, location, and content recognition of audio and/or video signals.

The communication server uses the identified common interests to identify 440 one or more in-call activities associated with the identified common interests. From the candidate in-call activities, the communication server selects 450 a recommended in-call activity for the plurality of participants. Once the recommended in-call activity is selected, the communication server transmits 460 an indication of the recommended in-call activity to a client device to enable to the client device to display a user interface control for initiating the recommended in-call activity. The communication server receives 470 a selection from the client device to initiate the recommended in-call activity from the client device. Responsive to receiving the selection, the communication server initiates 480 the recommended in-call activity on each of the plurality of client devices in response to the selection.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   facilitating a video call between a plurality of client devices over a network;
   retrieving user information associated with each participant of a plurality of participants associated with the plurality of client devices included in the video call;
   determining common interests among the plurality of participants based on the user information;
   identifying a plurality of in-call activities associated with the common interests;
   for each in-call activity:
      generating, for each of the plurality of participants, a score representing a likelihood of the participant selecting the in-call activity; and
      generating an aggregate score for the in-call activity by aggregating individual scores of the plurality of participants;
   selecting a recommended in-call activity from the identified plurality of in-call activities for the plurality of participants based on the aggregate scores of the plurality of in-call activities;
   transmitting to a client device of the plurality of client devices, an indication of the recommended in-call activity to enable the client device to display a user interface control for initiating the recommended in-call activity;
   receiving a selection from the user interface control displayed on the client device to initiate the recommended in-call activity from the client device;
   customizing contents of the recommended in-call activity for the plurality of participants based on the common interests; and
   initiating the recommended in-call activity on each of the plurality of client devices in response to the selection.

2. The method of claim 1, wherein the common interests are determined based on an overlap in user interests and user activities among the plurality of participants.

3. The method of claim 1, wherein the common interests are determined based on location and current time at the location of at least one participant of the plurality of participants.

4. The method of claim 1, wherein the common interests are determined based on relationships among the plurality of participants.

5. The method of claim 1, wherein the common interests are determined based on content recognition from an audio signal or a video signal from a client device during the video call.

6. The method of claim 1, wherein selecting the recommended in-call activity from the identified plurality of in-call activities comprises:
   ranking the identified plurality of in-call activities; and
   selecting the recommended in-call activity based on the ranking.

7. The method of claim 1, wherein the recommended in-call activity is displayed along with a plurality of default in-call activities.

8. The method of claim 7, wherein the plurality of default in-call activities is different for at least one participant of the plurality of participants.

9. The method of claim 1, wherein the one or more in-call activities include one or more of the following: watching a video, listening to music, interactive book reading, games, or karaoke.

10. A method comprising:
    establishing a video call with a plurality of client devices;
    generating a video call user interface (UI) window to be displayed during the video call;
    during the video call, receiving a recommendation of an in-call activity selected from a plurality of in-call activities for participants of the video call based on common interests among the participants, wherein the recommended in-call activity is selected based on a ranking of aggregate scores of the plurality of in-call activities, wherein each aggregate score associated with an in-call activity is generated by aggregating individual scores of the participants, and wherein each individual score represents a likelihood of the corresponding participant selecting the in-call activity;
    generating an in-call activity control in the UI window, the in-call activity control including the recommendation;
    receiving a selection of an in-call activity from the in-call activity control;
    transmitting the selection of the in-call activity to a server; and
    facilitating the in-call activity during the video call, wherein contents of the selected in-call activity are customized based on the common interests among the participants.

11. The method of claim 10, wherein the in-call activity control in the UI window dynamically updates over time.

12. The method of claim 10, wherein the in-call activity control in the UI window changes when a new participant is added to the video call.

13. The method of claim 10, further comprising:
    receiving a scrolling command in the in-call activity control; and responsive to receiving the request, scrolling through available in-call activities in the in-call activity control.

14. The method of claim 13, wherein an in-call activity displayed in the in-call activity control is removed from the in-call activity control and a new in-call activity is displayed.

15. The method of claim 10, wherein the in-call activity control overlaps a window displaying the video call.

16. A non-transitory computer-readable medium comprising computer program instructions that when executed by a computer processor of an online system cause the processor to perform steps comprising:
 facilitating a video call between a plurality of client devices over a network;
 retrieving user information associated with each participant of a plurality of participants associated with the plurality of client devices included in the video call;
 determining common interests among the plurality of participants based on the user information;
 identifying a plurality of in-call activities associated with the common interests;
 for each in-call activity:
  generating, for each of the plurality of participants, a score representing a likelihood of the participant selecting the in-call activity; and
  generating an aggregate score for the in-call activity by aggregating individual scores of the plurality of participants;
 selecting a recommended in-call activity from the identified plurality of in-call activities for the plurality of participants based on the aggregate scores of the plurality of in-call activities;
 transmitting to a client device of the plurality of client devices, an indication of the recommended in-call activity to enable the client device to display a user interface control for initiating the recommended in-call activity;
 receiving a selection from the user interface control displayed on the client device to initiate the recommended in-call activity from the client device;
 customizing contents of the recommended in-call activity for the plurality of participants based on the common interests; and
 initiating the recommended in-call activity on each of the plurality of client devices in response to the selection.

17. The non-transitory computer-readable medium of claim 16, wherein the common interests are determined based on an overlap in user interests and user activities among the plurality of participants.

18. The non-transitory computer-readable medium of claim 16, wherein the common interests are determined based on location and current time at the location of at least one participant of the plurality of participants.

19. The non-transitory computer-readable medium of claim 16, wherein the common interests are determined based on relationships among the plurality of participants.

20. The non-transitory computer-readable medium of claim 16, wherein the common interests are determined based on content recognition from an audio signal or a video signal from a client device during the video call.

* * * * *